US009256602B2

(12) United States Patent
Stratton et al.

(10) Patent No.: US 9,256,602 B2
(45) Date of Patent: Feb. 9, 2016

(54) SYSTEM AND METHOD FOR DISTRIBUTING AND PROVIDING RECOMMENDATIONS RELATED TO PLAYABLE CONTENT TO A USER BASED ON INFORMATION EXTRACTED FROM ONE OR MORE PLAYBACK DEVICES OF THE USER

(75) Inventors: John G. Stratton, Basking Ridge, NJ (US); Jesse Elliott Money, Boonsboro, MD (US); Roshan Lawrence Lewis, Columbia, MD (US); David Allen Welch, Laurel, MD (US)

(73) Assignee: Cellco Partnership, Basking Ridge, NJ (US)

( * ) Notice: Subject to any disclaimer, the term of this patent is extended or adjusted under 35 U.S.C. 154(b) by 1007 days.

(21) Appl. No.: 11/520,268

(22) Filed: Sep. 13, 2006

(65) Prior Publication Data
US 2008/0065741 A1   Mar. 13, 2008

(51) Int. Cl.
| G06F 15/16 | (2006.01) |
| G06F 17/30 | (2006.01) |
| H04L 29/06 | (2006.01) |
| H04L 12/28 | (2006.01) |
| G06Q 30/02 | (2012.01) |

(52) U.S. Cl.
CPC .... G06F 17/30029 (2013.01); G06F 17/30053 (2013.01); G06Q 30/02 (2013.01); H04L 12/2812 (2013.01); H04L 65/4084 (2013.01)

(58) Field of Classification Search
CPC ........... G06Q 30/0631; G06Q 20/1235; G06F 17/30749; G06F 17/30743; G06F 17/30772; H04L 12/2812; H04L 65/4084

USPC .......... 709/203, 217–219, 223–224, 231, 240
See application file for complete search history.

(56) References Cited

U.S. PATENT DOCUMENTS

| 7,081,579 | B2 * | 7/2006 | Alcalde et al. .................. 84/608 |
| 2003/0183064 | A1 * | 10/2003 | Eugene et al. .................. 84/609 |
| 2004/0103044 | A1 * | 5/2004 | Vandewater et al. ........... 705/27 |
| 2006/0041893 | A1 * | 2/2006 | Castro et al. .................. 719/320 |
| 2006/0218634 | A1 * | 9/2006 | Sodhi et al. .................... 726/22 |
| 2006/0242259 | A1 * | 10/2006 | Vallabh et al. ................ 709/217 |
| 2006/0259355 | A1 * | 11/2006 | Farouki et al. .................. 705/14 |
| 2007/0220552 | A1 * | 9/2007 | Juster et al. .................... 725/46 |
| 2007/0269787 | A1 * | 11/2007 | Cronstrom ................... 434/350 |
| 2008/0031475 | A1 * | 2/2008 | Goldstein ..................... 381/151 |
| 2008/0052371 | A1 * | 2/2008 | Partovi et al. ................ 709/217 |
| 2008/0059422 | A1 * | 3/2008 | Tenni et al. ....................... 707/3 |
| 2008/0065693 | A1 * | 3/2008 | Malik ........................ 707/104.1 |
| 2009/0076881 | A1 * | 3/2009 | Svendsen ........................ 705/10 |
| 2009/0077052 | A1 * | 3/2009 | Farrelly ............................ 707/5 |

* cited by examiner

Primary Examiner — David Lazaro

(57) ABSTRACT

A system and method for distributing playable content and for recommending playable content to a user where the recommendations are generated at a wide area network content server considering information extracted from one or more playback devices of the user by means of an intelligent agent resident on a processing device. The intelligent agent functions to scan the memory devices associated with the processing device and/or other devices in communication with the processing device for the purpose of determining what playable content is resident on the memory devices so scanned. Data related to the playable content uncovered during a scan is uploaded to the wide area network content server where the data is usable by a recommendation engine to make more informed recommendations for that user.

22 Claims, 2 Drawing Sheets

SYSTEM AND METHOD FOR DISTRIBUTING AND PROVIDING RECOMMENDATIONS RELATED TO PLAYABLE CONTENT TO A USER BASED ON INFORMATION EXTRACTED FROM ONE OR MORE PLAYBACK DEVICES OF THE USER

BACKGROUND OF THE INVENTION

In the art it is known to facilitate the downloading of playable content from a wide area network content server to playback devices having software and/or hardware appropriate for playing the playable content. Playback devices adapted to receive, store, and play playable content include devices such as personal computers, cellular phones, personal digital assistants, MP3 players, etc. To provide the playable content from the wide area network server to a playback device, various delivery mechanisms are currently employed. For example, the playable content may be delivered directly to a playback device from the wide area network content server and/or the playable content may be indirectly delivered to a playback device using an intermediate computing device, such as a personal computer or other device acting as an Internet gateway, that is adapted to communicate with both the wide area network content server as well as a playback device.

Systems and methods for recommending playable content, e.g., for purchase by a consumer, are also known in the art. For example, U.S. Pat. No. 7,013,238, assigned to Microsoft, describes a system for generating recommendations wherein a user supplies feedback pertaining to recommendations previously provided to the user and the system processes the feedback to provide future recommendations to the user. Similarly, U.S. Pat. No. 6,947,922, assigned to Xerox, describes a system in which implicit ratings are generated by monitoring user interactions with a playback device and the system uses the implicit ratings to generate recommendations for further playable content. Still further, unassigned, U.S. Published Application No. 2005/0038819 describes a system in which recommendations related to playable content are generated using information gathered via an e-commerce engine that receives selections of playable content desired to be purchased by a user. Yet further, U.S. Pat. No. 6,438,579, assigned to Agent Arts, Inc., describes a content and collaborative filtering engine which uses similarities in ratings provided by a community of users to provide playable content recommendations to a particular user.

While systems and methods such as those described above generally work for their intended purpose, a need exists for an improved system and method for distributing playable content from a wide area network content server which, among other things, also provides recommendations considering preferences of a user that have not in the past been made available for use by a recommendation engine associated with the wide area network content server.

SUMMARY OF THE INVENTION

To address this and other needs, the following describes a system and method for distributing playable content as well as for recommending playable content to a user where the recommendations are generated at a wide area network content server considering information extracted from one or more playback devices of the user. To this end, the system provides on a processing device an intelligent agent that functions to scan memory devices associated with the processing device (and/or other devices in communication with the processing device) for the purpose of determining what playable content is resident on the memory devices so scanned. While the wide area network content server may be aware of at least all playable content that has been downloaded by a user using the wide area network content server, the wide area network content server will not normally be aware of additional playable content that is of interest to a user which has been placed onto the memory devices from sources other than the wide area network content server, such as digital music files that are ripped from an audio CD. Thus, by performing a scan for playable content and by providing to the wide area network content server for use with a recommendation engine data related to any playable content found during the scanning process, such as meta-data associated with the playable content, time stamps, etc., a more informed recommendation can be made for the user by the recommendation engine. The system further provides for the downloading to the playback device playable content retrieved from the wide area network content server toward providing the user with playable content and/or the ability to acquire additional rights thereto.

A better understanding of these and other objects, advantages, features, properties and relationships of the system and method will be obtained from the following detailed description and accompanying drawings which set forth illustrative embodiments that are indicative of the various ways in which the principles expressed hereinafter may be employed.

BRIEF DESCRIPTION OF THE DRAWINGS

For a better understanding of the system and method reference may be had to preferred embodiments shown in the following drawings in which.

DETAILED DESCRIPTION

Figure 1:
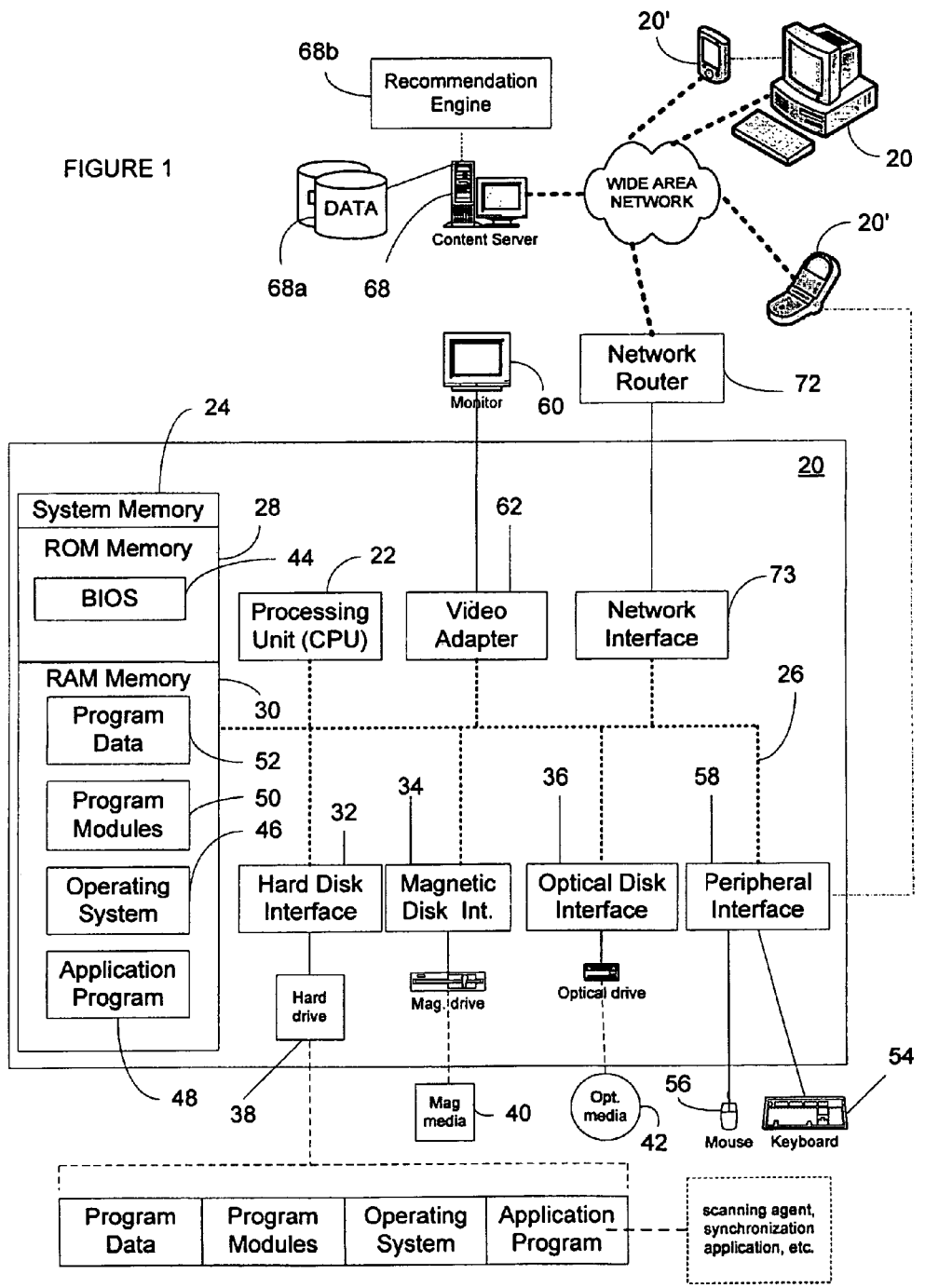
FIG. 1 illustrates an exemplary system for use in distributing playable content to a playback device and for providing recommendations related to playable content.

Turning to the figures, wherein like reference numerals refer to like elements, an exemplary system and method for distributing playable content to a playback device and for providing recommendations related to playable content is hereinafter described. In particular, as illustrated in FIG. 1, the system and method will be described in the context of a plurality of processing devices linked via a wide area network, such as the World Wide Web or the Internet. In this regard, a processing device 20, illustrated in the exemplary form of a personal computer system, is provided with executable instructions to, for example, provide a means for a user to access a wide area network content server 68 and thereby perform actions associated with retrieving from the wide area network content server 68 playable content, such as music, videos, games, etc, and/or other data related to playable content, such as licenses, meta-data, etc. Generally, the computer executable instructions reside in program modules which may include routines, programs, objects, components, data structures, etc. that perform particular tasks or implement particular abstract data types. Accordingly, those skilled in the art will appreciate that the processing device 20 may be embodied in any device having the ability to execute instructions such as, by way of example, a personal computer, mainframe computer, personal-digital assistant (PDA), cellular telephone, or the like. Furthermore, while described and illustrated in the context of a single processing device 20, those skilled in the art will also appreciate that the various tasks described hereinafter may be practiced in a distributed environment having multiple processing devices linked via a local or wide area network whereby the executable instructions may be associated with and/or executed by one or more of multiple processing devices.

For performing the various tasks in accordance with the executable instructions, the processing device 20 preferably includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard drive 38, reading from or writing to a removable magnetic disk 40, and for reading from or writing to a removable optical disk 42, such as a CD/DVD or other optical media. The drive interfaces and their associated computer-readable media allow for the nonvolatile storage of computer readable instructions, data structures, program modules and other data for the processing device 20. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nanodrives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser, content rendering application, etc.), other program modules 50, and/or program data 52. Still further, computer-executable instructions may be downloaded to one or more of the computing devices as needed, for example, via a network connection.

An end-user may enter commands and information into the processing device 20 through input devices such as a keyboard 54 and/or a pointing device 56. While not illustrated, other input devices may include a microphone, a joystick, a game pad, a scanner, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as speakers and printers.

As further illustrated in FIG. 1, the processing devices 20 may also utilize logical connections to one or more remote processing devices, such as the wide area content server 68 having associated data repositories 68a. As will become evident from the description that follows, the data repositories 68a may be used to maintain a library of playable content and associated data as well as information related to users of the system, such as registration information, user preferences, user profiles, etc. While the remote processing device 68 has been illustrated in the exemplary form of a network server, it will be appreciated that the remote processing device 68 may be any type of device having processing capabilities. Again, it will be appreciated that the remote processing device 68 need not be implemented as a single device but may be implemented in a manner such that the tasks performed by the remote processing device 68 are distributed to a plurality of processing devices linked through a communication network.

For performing tasks as needed, the remote processing device 68 may include many or all of the elements described above relative to the processing device 20. In this illustrative embodiment the remote processing device 68 additionally includes executable instructions for managing the distribution and use of playable content and for providing recommendations related to playable content, e.g., instructions in the form of a recommendation engine 68b.

Communications between devices on the wide area network may be exchanged via a further processing device, such a network router 72, that is responsible for network routing. Communications with the network router 72 may, in turn, be performed via a network interface component 73.

In certain embodiments additional processing devices 20', such as a cellular phone, PDA, etc., may be placed into communication with a processing device 20 by means of an interface. In this manner, the processing devices 20' may not only exchange data with the processing device 20 but may also use the processing device 20 as a gateway to the wide area network. As additionally illustrated in FIG. 1, a processing device 20' may also be provided with the ability to connect to the wide area network directly, such as a cellular telephone that may communicate directly or indirectly with the wide area network content server via the wireless communication network operated by a wireless carrier. It will again be appreciated that, as required to perform various tasks, a processing device 20' may similarly include many or all of the elements described above relative to the processing device 20.

To distribute playable content within the illustrated, exemplary network system, the wide area network content server 68, the processing device 20, and the processing device 20' may be provided within complimentary applications which allow for the navigation of the library of playable content, the downloading of certain playable content and/or associated data, the registering of users and/or processing devices 20 within the system, etc. By way of example, the system applications may cooperate to provide a subscription service that will allow users to download playable content to a processing device 20 and/or a processing device 20'. When playable content is downloaded to a processing device 20, the playable content may be transferred to a processing device 20' as part of a synchronization process which, for example, may be executed each time the portable processing device 20' is placed into communication with the processing device 20, such as by a USB cable or other hard wire connection. In this manner, once downloaded into a processing device having software/hardware needed to allow the processing device to function as a playback device, a user may play the playable content in keeping with any restrictions that might be imposed by the system. For example, in the context of a subscription service, the playable content may be playable on a playback device only for so long as a user maintains their subscription with the service and, should the user attempt to play playable content after expiration of the subscription, the playback device may function to display a message explaining the reason for the inability to play the playable content while urging renewal of the subscription. Playback need not be effected as a result of any subscription status in the event that the playable content has been purchased by a user.

It will also be appreciated that the system may provide additional restrictions on downloaded playable content to, for example, comply within applicable usage laws, such as placing restrictions on the ability to further copy downloaded playable content onto a removable storage media, such as an optical disc. Still further, the system may control digital rights management (DRM) license acquisition by maintaining within the data repository 68a a list of "authorized" processing devices 20 and processing devices 20' on which playable content may be played. By way of example, the system may maintain a list of processing devices 20, e.g., personal computers, and processing devices 20', such as cell phones, that are associated with a user's account where the user may be provided with the ability to authorize or deauthorize the processing devices 20 while a system administrator is provided with the ability to authorize or deauthorize the processing devices 20'.

As concerns the processing devices 20 that may be user authorized or deauthorized, the system may function to associate with the processing device 20 a unique, persistent identifier that cannot be deleted or modified by the user. The identifier may be automatically placed into memory of the processing device 20 when the user first accesses the wide area network content server 68 for the purpose of interacting with the playable content distribution application of the wide area content server 68, e.g., when the user creates an account with the playable content distribution application of the wide area content server 68 using the computing device 20. In this manner, before the user is able to download playable content to the processing device 20, the system will check the processing device 20 to determine if it is authorized within the system. If the processing device 20 is not authorized, the user may be prohibited from downloading desired playable content to the processing device 20 while being prompted to authorize that processing device 20 within the system. For this purpose, the wide area content server 68 may cause the display of a page that lists all devices authorized for a particular user, both processing devices 20 and processing devices 20', along with an identifier for the processing device 20 that is currently being used to access the wide area network content server 68. From this page, the user may then request that the processing device 20 currently being used to access the wide area network content server 68 be authorized within the system. In certain circumstances the system may not allow the processing device 20 to become authorized, e.g., if the authorization of the processing device 20 exceeds an authorization limit imposed by the system.

When the processing device 20 is used in an attempt to play playable content that has been downloaded from the wide area network content server 68 in the subscription context, it will first be determined if a license is required to play that playable content. For example, if a license is expired (i.e., the license may be time or use limited), invalid, or missing and if the processing device 20 is authorized within the system, the wide area network content server 68 may automatically provide the required license to the processing device 20 to enable playing of the playable content on the processing device 20 without the need for any user notification or user interaction. However, if a license is expired, invalid, or missing and the processing device 20 is not authorized within the system, the system may notify the user that the processing device 20 is not authorized, e.g., using a dialog box, and may further allow for the user to proceed to authorize the processing device 20 as described above and/or may allow for the purchase of the license for the playable content. Authorization of the processing device 20 may also result in the system automatically providing licenses for any additional, downloaded playable content that might be resident on the processing device 20. Furthermore, if the processing device 20 has been deauthorized in the subscription context, any attempt to acquire a subscription based license from that deauthorized processing device 20 may result in the system removing all subscription based licenses for downloaded music from that processing device 20.

Considering now a computing device 20', if the user attempts to play playable content downloaded from the wide area network content server 68 in the subscription context, the system will similarly determine if a license is required to play that playable content. If a license is expired, invalid, or missing and if the processing device 20' is authorized within the system, the system may automatically provide the license to the processing device 20' to enable playing of the playable content without the need for any user notification or user interaction. However, if a license is expired, invalid, or missing and if the processing device 20' is not authorized within the system, the system may again cause the user to be notified that the processing device 20' is not authorized for playback and, in this case, only allow for the user to purchase the license for the playable content to thereby enable playing of the playable content, i.e., processing device 20' is preferably authorizable only by a system administrator. In the event that the processing device 20' has been deauthorized in the subscription context, any attempt to acquire a subscription based license from that deauthorized processing device 20' may result in the system removing all subscription based licenses for downloaded music from that processing device 20'.

To provide recommendations related to playable content, the system is provided with a recommendation engine 68b. In this regard, the recommendation engine 68b may provide recommendations to a user considering information stored within the data repository 68a that relates to the user particularly and/or other users of the system. For example, the recommendation engine 68b may provide recommendations considering one or more of: feedback provided to the system by one or more users as concerns previously provided recommendations; implicit ratings generated by monitoring the interactions of one or more users with a playback device; information gathered via an e-commerce engine that receives selections of playable content desired to be purchased by one or more users; and user demographics generally (which may be obtained at the time of registration with the system and/or periodically during use of the system).

Figure 2:
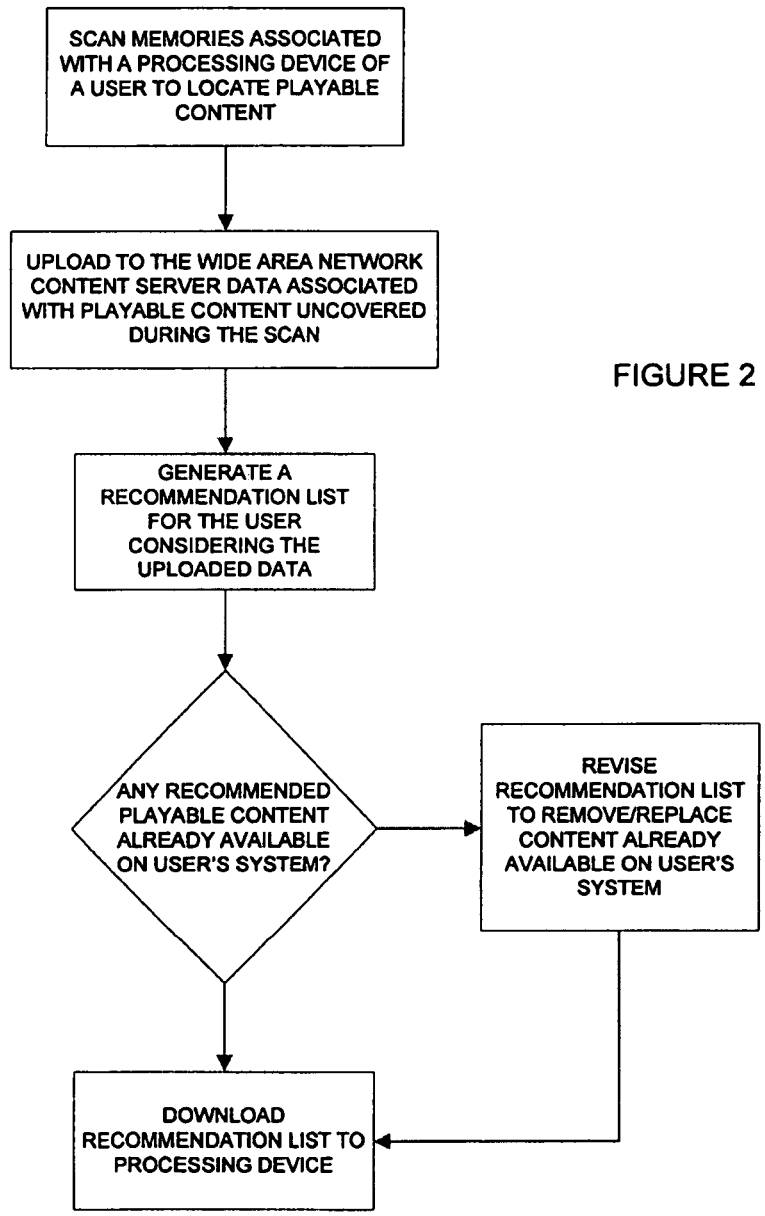
FIG. 2 is a flow chart illustrating an exemplary method for generating recommendations and providing recommendations to a user.

To further assist in the recommendation process, the system may also provide on a processing device 20 an application, e.g., an intelligent software agent, that functions, as illustrated in FIG. 2, to scan the memory devices associated with the processing device 20 (and/or other devices in communication with the processing device 20) for the purpose of determining what playable content is resident on the memory devices so scanned. As will be appreciated, while the wide area network content server 68 will be aware of at least all playable content that has been downloaded using the wide area network content server 68, the wide area network content server 68 may not be aware of additional playable content that has been placed onto the memory devices from sources other than the wide area network content server 68, such as by being ripped from a CD. Thus, by performing a system scan for playable content and by providing data related to any found playable content, e.g., meta-data associated with the playable content, to the wide area network content server 68, a more informed recommendation can be made by the recommendation engine 68b as the recommendation engine 68b will thus have access to additional information concerning a particular user which information the recommendation engine 68b would typically not have access to.

Additionally, the scanning process may function to retrieve and upload to the wide area network server 68 further information such as a time or times at which playable content was stored on a memory device, played, etc. It will be appreciated that any such information uploaded from a processing device 20 may be used by the recommendation engine 68b alone or in connection with the various types of information discussed above to generate recommendations. For example, information concerning playable content ripped from a CD earlier or later in time relative to other playable content may indicate to the recommendation engine 68b a preference for a particular type of playable content relative to other types of playable content which preference may then be used in connection with selecting playable content from the library for recommendation to a user. It will also be appreciated that, while the scanning and uploading of information concerning playable media associated with the processing device 20 to the wide area network content server 68 may be performed automatically, for example on scheduled basis, to provide for the protection of privacy it may be desirable to allow a user to configure the system to enable or disable the scanning/uploading functionality, to establish which memory devices are to be scanned, to manually initiate the performing of the scanning/uploading, etc.

To provide the recommendations of playable content to a user (which the user may then rate, use to purchase playable content, etc.), the system may be setup to provide the recommendations on a scheduled basis and/or in response to a specific request to receive recommendations. The recommendations that are to be provided to the user, for example by being downloaded from the wide area network content server 68 to a processing device 20, may comprise a listing of playable content that has been selected for the user by the recommendation engine 68b which listing may also include portions of or the entirety of the playable content (and appropriate licenses) for sampling by the user, such as a play list in the context of digital music files. In the case where the listing includes portions of or the entirety of the playable content, restrictions may be imposed upon the playing of the playable content as noted above. For example, a use license may be limited in time, limited in number of plays, may be device specific, etc. Furthermore, since by the scanning/uploading process described above the recommendation engine 68a can be made aware of playable content a user may have already stored on a device, the recommendation engine 68a may advantageously avoid recommending playable content to a user which the system is aware the user already has access to.

Another aspect of the present invention provides for the generated recommendations to include additional forms of playable content such as ring tones, ring-back tones, or other audio-video content such as music videos. The user may further be offered the option of purchasing such additional content associated with or related to playable content that is made available for downloading to the processing device 20'.

For the purpose of facilitating the transfer of recommendations and/or data associated with playable content from a processing device 20 to a processing device 20', the system may provide functionality that serves to automatically synchronize the processing device 20' to the processing device 20. By way of example, a synchronization application may be provided to the processing device 20 which, when enabled, will function to synchronize the processing device 20' to the processing device 20 each time the processing device 20' is brought into communication with the processing device 20. Furthermore, prior to downloading any data to the processing device 20', the synchronization application may function to determine the amount of memory available in the processing device 20'. The synchronization application may then automatically select which data to download to the processing device 20' given the amount of free memory. Alternatively, the synchronization application may function to inform the user of the amount of memory determined to be available in the event that the amount of data to be download as part of the synchronization process is determined to be larger than an amount available memory can handle. For example, if it is desired that twenty percent of the memory of the processing device 20' remain free for use with other applications and the amount of data to be downloaded as part of the synchronization process would require use of this memory, the synchronization application may notify the user of this fact and request that the user select or deselect which data the user would like to include in the download until an appropriate amount of data to be download is achieved. A user may also be provided with an opportunity to initially specify what is to be transferred to the processing device 20' with the system then checking the memory size to determine if a download of the selected data should proceed.

As a further aspect of the synchronization process it may be desired that the synchronization process not cause the overwriting, removal, or replacement of any playable content that the user has purchased and has placed into memory of the computing device 20'. Similarly, the synchronization process may avoid the downloading of any playable content which has been already purchased and stored on the computing device 20'. Otherwise, the synchronization process may function to replace a recommendation list and/or subscription based content that was previously downloaded to the computing device 20'. However, prior to replacing any playable content on the computing device 20', the system may give a user the option to add that playable content to a locked library of the computing device 20'.

While specific embodiments of the invention have been described in detail, it will be appreciated by those skilled in the art that various modifications and alternatives to those details could be developed in light of the overall teachings of the disclosure. For example, it will be appreciated that the various processes described herein may be implemented in either software and/or hardware without limitation. Accordingly, the particular arrangement disclosed is meant to be illustrative only and not limiting as to the scope of the invention which is to be given the full breadth of the appended claims and any equivalents thereof.

All patents, patent applications, and other references cited within this document are hereby incorporated by reference in their entirety.

What is claimed is:

1. A method for providing recommendations related to playable content, comprising:
   receiving from a user of a user account authorization of at least one processing device of a plurality of processing devices associated with the user account;
   authorizing by an administrator of a wide area network server at least one mobile processing device of a plurality of mobile processing devices associated with the user account, the at least one mobile device being in communication with the at least on processing device;

receiving a selection of one or more memories for each of the at least one processing device and the at least one mobile processing device to scan for playable content;

using a scanning application on a scheduled basis to scan the selected on or more memories to locate all of the playable content that is stored within the selected on or more memories;

uploading to a wide area network server data associated with all of the playable content located on the selected one or more memories scanned by the scanning application;

using the uploaded data in a recommendation engine associated with the wide area network server to generate a playable content recommendation list, the playable content recommendation list referencing recommended playable content and including limited use licenses associated with the recommended playable content to allow sampling of the recommended playable content and based at least in part on user feedback concerning previously provided recommendations;

providing from the wide area network sever to the at least on processing device the generated playable content recommendation list on a scheduled basis;

determining an amount of available memory in the at least on mobile processing device;

automatically selecting at least a subset of the generated playable content recommendation list to sync from the at least on processing device to the at least on mobile device such that the selected at least a subset of the generated playable content recommendation list does not exceed the available memory;

wherein the data associated with the playable content located on the one or more memories scanned by the scanning application comprises times at which playable content was stored on the one or more memories.

2. The method as recited in claim 1, further comprising downloading the selected at least a subset of a playable content recommendation list from the at least one processing device to the at least one mobile processing device during a synchronization process.

3. The method as recited in claim 1, comprising automatically editing the generated playable content recommendation list by the recommendation engine to remove from the playable content recommendation list any playable content located on the one or more memories by the scanning application.

4. The method as recited in claim 1, comprising downloading the scanning application from a wide area network server to the processing device.

5. The method as recited in claim 1, wherein the data associated with playable content located on the one or more memories by the scanning application comprises meta data associated with the playable content.

6. The method as recited in claim 1, wherein the data associated with the playable content located on the one or more memories by the scanning application comprises times at which playable content was played from the one or more memories.

7. The method as recited in claim 1, comprising accepting user input to inhibit execution of the scanning application.

8. The method as recited in claim 1, comprising accepting user input which functions to designate the one or more memories to be scanned by the scanning application.

9. The method as recited in claim 1, further comprising:

providing a unique identifier associated with the at least one processing device to the wide area network server to validate the at least one processing device as being authorized to interact with a playback content distribution application of the wide area network server; and automatically receiving a license to enable playing of the playable content located on the one or more memories if the at least one processing device is authorized to interact with the playback content distribution application.

10. The method as recited in claim 9, further comprising:

in response to the license being expired, invalid, or missing and the at least one processing device being authorized to interact with the playback content distribution application of the wide area network server, receiving the license without any user notification or user interaction; and in response to the license being expired, invalid, or missing and the at least one processing device not being authorized to interact with the playback content distribution application of the wide area network server, receiving a notification that the at least one processing device is not authorized.

11. The method as recited in claim 9, further comprising:

in response to the at least one processing device being authorized to interact with the playback content distribution application, automatically receiving licenses for additional, downloaded playable content that might be resident on the at least one processing device; and in response to the processing device being deauthorized to interact with the playback content distribution application and subsequently attempting to acquire a subscription based license, automatically removing all subscription-based licenses for downloaded content from the at least one processing device.

12. The method as recited in claim 1, further comprising:

displaying a listing of processing devices authorized for the user account; and providing a request to the wide area network server that the processing device be authorized for the user account to interact with a playback content distribution application of the wide area network server.

13. The method as recited in claim 1, wherein the playable content recommendation list is further generated using at least one of information gathered via an e-commerce engine that receives selections of playable content desired to be purchased by one or more users, and user demographics obtained when the user creates the user account.

14. A system for providing recommendations related to playable content, comprising:

a wide area network server having an associated recommendation engine and a scanning Application;

a plurality of processing devices in communication with the wide area network server and associated with a user account, at least one processing device of the plurality of processing devices being authorized by a user of the user account;

a plurality of mobile processing devices in communication with the at least one processing device and the wide area network server and associated with the user account, at least one mobile processing device of the plurality of mobile processing devices being authorized by an administrator of the wide area network server;

wherein the wide area network is configured to receive a selection of one or more memories of each of the at least one processing device and the at least one mobile processing device to scan for playable content, wherein the scanning application is configured to scan the selected one or more memories on a scheduled basis to locate all of the playable content stored within the one or more memories, and upload to the wide area network server data associated with all of the playable content located on the one or more memories scanned by the scanning application, wherein the recommendation engine associated with the wide area network server uses the data uploaded from the processing device to generate a playable content recommendation list, the playable content recommendation list referencing recommended playable content and including limited use licenses associated with the recommended playable content to allow sampling of the recommended playable content and based at least in part on user feedback concerning previously provided recommendations, wherein the wide area network server is further configured to provide to the at least one processing device the generated playable content recommendation list on a scheduled basis, wherein a synchronization manager on the at least one processing device is configured to determine an amount of available memory on the at least one mobile processing device, and to automatically select at least a subset of the generated playable content recommendation list to sync from the at least one processing device to the at least one mobile processing device such that the selected at least a subset of the generated playable content recommendation list does not exceed the available memory, and wherein the data associated with the playable content located on the one or more memories scanned by the scanning application comprises times at which playable content was stored on the one or more memories.

15. The system as recited in claim 14, wherein the synchronization manager is configured to download the selected at least a subset of the generated playable content recommendation list from the at least one processing device to the at least one mobile processing device during a synchronization process.

16. The system as recited in claim 14, wherein the recommendation engine functions to edit the generated playable content recommendation list to remove from the playable content recommendation list any playable content located on the one or more memories scanned by the scanning application.

17. The system as recited in claim 14, wherein the data associated with playable content located on the one or more memories scanned by the scanning application comprises meta data associated with the playable content.

18. The system as recited in claim 14, wherein the data associated with the playable content located on the one or more memories scanned by the scanning application comprises times at which playable content was played from the one or more memories.

19. The system as recited in claim 14, wherein the scanning application accepts user input to inhibit execution of the scanning application.

20. The system as recited in claim 14, wherein the scanning application accepts user input which functions to designate the one or more memories to be scanned by the scanning application.

21. The system as recited in claim 14, the limited use licenses including limitations on playback of the recommended playable content, the limitations including to at least one of: a time period of licensed use, a predetermined number of authorized playbacks, and an identification of devices authorized to playback the recommended playable content.

22. A non-transitory computer readable medium storing an application program, the application program being executable by a processing unit of a processing device to provide operations comprising:

receiving a selection of one or more memories associated with the processing device to scan for playable content.

scanning on a scheduled basis the one or more memories associated with the processing device to locate playable content stored within the one or more memories;

uploading, to a wide area network server, scanned data associated with the playable content located on the one or more memories; and receiving, on a scheduled basis from the wide area network server based on the scanned data, a playable content recommendation list referencing recommended playable content and including limited use licenses associated with the recommended playable content to allow sampling of the recommended playable content and based at least in part on user feedback concerning previously provided recommendations;

automatically selecting at least a subset of the generated playable content recommendation list to sync from the processing device to at least one mobile processing device such that the selected at least a subset of the generated playable content recommendation list does not exceed an available memory on the at least one mobile processing device;

wherein the data associated with the playable content located on the one or more memories scanned by the scanning application comprises times at which playable content was stored on the one or more memories.

* * * * *